(12) United States Patent
Schütz

(10) Patent No.: US 8,662,827 B2
(45) Date of Patent: Mar. 4, 2014

(54) HOUSING FOR A COMPRESSOR OF A GAS TURBINE, COMPRESSOR, AND METHOD FOR PRODUCING A HOUSING SEGMENT OF A COMPRESSOR HOUSING

(75) Inventor: Gottfried Schütz, Tutzing (DE)

(73) Assignee: MTU Aero Engines AG, Munich (DE)

( * ) Notice: Subject to any disclaimer, the term of this patent is extended or adjusted under 35 U.S.C. 154(b) by 580 days.

(21) Appl. No.: 12/994,729

(22) PCT Filed: May 26, 2009

(86) PCT No.: PCT/DE2009/000723
§ 371 (c)(1),
(2), (4) Date: Nov. 24, 2010

(87) PCT Pub. No.: WO2009/143820
PCT Pub. Date: Dec. 3, 2009

(65) Prior Publication Data
US 2011/0085900 A1    Apr. 14, 2011

(30) Foreign Application Priority Data
May 28, 2008  (DE) .......................... 10 2008 025 511

(51) Int. Cl.
*F01D 25/14* (2006.01)
(52) U.S. Cl.
USPC ...................................................... 415/116
(58) Field of Classification Search
USPC ........... 415/108, 116, 175, 144, 214.1, 215.1, 415/220, 173.1; 416/93 R
See application file for complete search history.

(56) References Cited

U.S. PATENT DOCUMENTS

| | | | |
|---|---|---|---|
| 3,365,172 A * | 1/1968 | Howald et al. | 415/117 |
| 4,732,531 A * | 3/1988 | Minoda et al. | 415/115 |
| 5,167,488 A | 12/1992 | Ciokajlo et al. | |
| 6,155,778 A * | 12/2000 | Lee et al. | 415/116 |
| 6,644,935 B2 * | 11/2003 | Ingistov et al. | 417/244 |
| 2008/0202718 A1* | 8/2008 | Paul et al. | 164/23 |
| 2009/0047126 A1* | 2/2009 | Ress, Jr. | 415/209.3 |

FOREIGN PATENT DOCUMENTS

| | | |
|---|---|---|
| EP | 0391525 A1 | 10/1990 |
| EP | 0947669 A2 | 10/1999 |
| GB | 779667 A | 7/1957 |
| GB | 2048386 A | 12/1980 |
| GB | 2114661 A | 8/1983 |

* cited by examiner

Primary Examiner — Edward Look
Assistant Examiner — Liam McDowell
(74) Attorney, Agent, or Firm — Howison & Arnott, L.L.P.

(57) ABSTRACT

The invention at hand relates to a housing for a compressor of a gas turbine, in particular of an aircraft gas turbine, with an external housing with at least one air supply opening and an interior housing formed by at least two housing segments, with the housing segments having at least one injection nozzle to inject air suctioned in via the air supply openings into a flow channel in the area of blade tips of blades of a rotor of the compressor. In this case, the housing segment has at least one air flow channel, with the air flow channel being designed in such a way that a direct air supply to the at least one injection nozzle occurs via at least one air supply element arranged in the air supply opening of the exterior housing. The invention relates moreover to a compressor of a gas turbine as well as to a method for the manufacture of a housing segment of a compressor housing.

18 Claims, 4 Drawing Sheets

HOUSING FOR A COMPRESSOR OF A GAS TURBINE, COMPRESSOR, AND METHOD FOR PRODUCING A HOUSING SEGMENT OF A COMPRESSOR HOUSING

CROSS-REFERENCE TO RELATED APPLICATIONS

The present application is a U.S. National Phase application submitted under 35 U.S.C. §371 of Patent Corporation Treaty Application Serial No. PCT/DE2009/000723, filed May 26, 2009, entitled HOUSING FOR A COMPRESSOR OF A GAS TURBINE, COMPRESSOR, AND METHOD FOR PRODUCING A HOUSING SEGMENT OF A COMPRESSOR HOUSING, which application claims priority to German Application Serial No. 10 2008 025 511.4, filed May 28, 2008, entitled GEHÄUSE FÜR EINEN VERDICHTER EINER GASTURBINE, VERDICHTER UND VERFAHREN ZUR HERSTELLUNG EINES GEHÄUSESEGMENTS EINES VERDICHTERGEHÄUSES, the specifications of which are incorporated herein by reference.

TECHNICAL FIELD

The invention at hand relates to a housing for a compressor of a gas turbine, in particular of an aircraft gas turbine, with an external housing with at least one air supply opening and an interior housing formed by at least two housing segments, with the housing segments having at least one injection nozzle to inject air suctioned in via the air supply openings into a flow channel in the area of blade tips of the blades of a rotor of the compressor. The invention moreover relates to a compressor of a gas turbine as well as to a method for the manufacture of a housing segment of a compressor housing.

BACKGROUND

In the case of gas turbines, the so-called surge limit marks the smallest possible gas flow at a given pressure increase at which the compressor can still be operated in stable fashion. In the event of a collapse of the entire compressor flow, the pressure normally built up behind the compressor discharges abruptly forward in the direction of the low pressure. Subsequently, another gas intake by the compressor occurs until it comes to another abrupt pressure decrease. This process is called as "compressor pumping". Such "compressor pumping" must be prevented by all means in gas turbines, particularly in the case of aircraft gas turbines, since the compressor as well as downstream components of the gas turbine, namely the combustion chamber and the turbine, may be damaged in the process. Therefore, an extension of such surge limits is desirable. In this context is has been shown that a surge limit expansion is possible by injecting air into the blade tip area of a turbo compressor. In order to realize this injection, a supply of air is required under high pressure into the housing of the compressor from outside. This air must then be transported through nozzles in targeted fashion from the housing into the flow channel which usually occurs through slotted housing segments. In this context, in the case of a compressor housing commonly designed in clamshell fashion, a circumferential pressure compensation space, a so-called plenum, in the housing is subjected to pressure and the air is then fed into the flow channel through the aforementioned housing segments equipped with shaped slots or nozzles.

However, the disadvantage of these known compressor housings is the necessary sealing between the individual housing segments, for example by means of sealing plates, which, however, will not ensure a perfect sealing. In addition, the housing segments are subjected to a great pressure differential between the pressure compensation space and the flow channel, requiring a relatively strong structural design of the housing segments and a correspondingly great weight.

SUMMARY AND DESCRIPTION

It is therefore the objective of the current disclosure to provide a generic housing for a compressor of a gas turbine, in particular of an aircraft gas turbine, that requires no extensive sealing measures between individual housing segments and that, in addition, has a low weight.

It is moreover the objective of the current disclosure to provide a generic compressor that can be manufactured at relatively low costs and that has a reduced weight.

It is moreover the objective of the current disclosure to provide a generic method with which the housing segments of the compressor housing can be manufactured in relatively simple fashion and cost-effectively.

These objectives may be met by a housing in accordance with the characteristics as disclosed and claimed herein; a compressor in accordance with the characteristics as disclosed and claimed herein; and a method in accordance with the characteristics as disclosed and claimed herein.

Advantageous embodiments of the invention are described in the respective claims and subclaims.

A housing in accordance with one embodiment for a compressor of a gas turbine, in particular of an aircraft gas turbine, comprises an exterior housing with a least one air supply opening and an interior housing formed by at least two housing segments, with the housing segments having at least one injection nozzle to inject air supplied via the air supply openings into a flow channel in the area of blade tips of blades of a rotor of the compressor. In addition, the housing segment has at least one air flow duct, with the air flow duct being designed in such a way that a direct air flow to the at least one injection nozzle occurs via an air supply element located in the air supply opening of the exterior housing. In accordance with this embodiment, the air supply occurs directly into each housing segment, thereby making a pressure compensation space unnecessary. Therefore, the housing segments do not need to be sealed against each other, for example by means of sealing plates. Moreover, the housing segments will not be stressed by any high pressure applied on large areas. This makes it possible to make the individual housing segments structurally lighter and to provide them with light weight. Overall, this will lead to a clear reduction in the weight of the compressor housing in accordance with the invention. Finally, leaks will be avoided since at least one air flow channel with a corresponding injection nozzle is integrated into each housing segment.

In advantageous embodiments of the housing in accordance with the invention, the air supply element is designed as one piece together with the housing segment or as a separate element. In this context, it is possible to design the air supply element in the form of a socket or a pipe. Moreover, in the case of a separate design of the air supply element, it is possible to design the latter as a screw-in socket in such a way that the air supply element is screwed together with the exterior housing. Moreover, it is possible in the case of a separately designed air supply element for a collar surrounding an opening in the housing segment to be formed to support the air supply element in the area of the housing segment facing the exterior housing. In this case, at least one seal, in particular a seal designed as an O-ring, is arranged between the air supply element and the air flow duct. Due to the design of the housing segment of the compressor housing done in accordance with the invention, the sealing of the air supply element on the housing segment occurs on an easily manageable circular cross section, for example by means of the aforementioned O-ring.

In another advantageous embodiment of the housing in accordance with the invention, the injection nozzle has a slot-like design. The slot-like design of the injection nozzle assures the supply of air into the flow channel at high pressure.

In other advantageous embodiments of the housing in accordance with the invention, the housing segment is made of metal, of a metal alloy, of ceramics, of a fiber-reinforced composite material or of a combination of at least two of these materials. In this context, the selection of materials occurs in accordance with the pressure and temperature requirements of the compressor housing. However, in comparison with customary compressor housings, a greater multitude of materials may be utilized since in particular the requirement with regard to pressure stability may be reduced in accordance with the disclosure.

A compressor in accordance with another embodiment of a gas turbine, in particular of an aircraft gas turbine, comprises a housing as described above. By using such a housing, the overall cost for the compressor may be reduced, on the one hand, and, on the other hand, the weight of the compressor can be reduced significantly. The advantages of the housing used for the compressor in accordance with the disclosure have been described above.

In the case of the method in accordance with yet another embodiment for the manufacture of a housing segment of a compressor housing of a gas turbine, in particular of an aircraft gas turbine, the housing segment is manufactured by means of a generative manufacturing process and/or of an electrochemical processing method and/or by means of investment casting. The generative manufacturing process may involve laser sintering. The housing segment manufactured in accordance with the invention involves a part of an interior housing of the compressor with at least one injection nozzle to inject air suctioned in via air supply openings into a flow channel in the area of blade tips of blades of a rotor of a compressor, with the housing segment also having at least one air flow duct and the air flow duct being designed in such a way that a direct air flow occurs to the at least one injection nozzle via at least one air flow element arranged in the air supply opening of the exterior housing. The manufacturing process in accordance with the invention provides a relatively simple and cost-effective production of the individual housing segments. In particular, the three-dimensional design of the housing segments is realizable without any great effort by means of the investment casting process or even through generative production processes.

BRIEF DESCRIPTION OF THE DRAWINGS

Additional advantages, characteristics and details of the invention can be found in the following description of an embodiment represented in drawings. Shown are in FIG. 1 a schematic representation of a cross section through a partial area of a housing in accordance with one embodiment of the invention.

DETAILED DESCRIPTION

Figure 1:
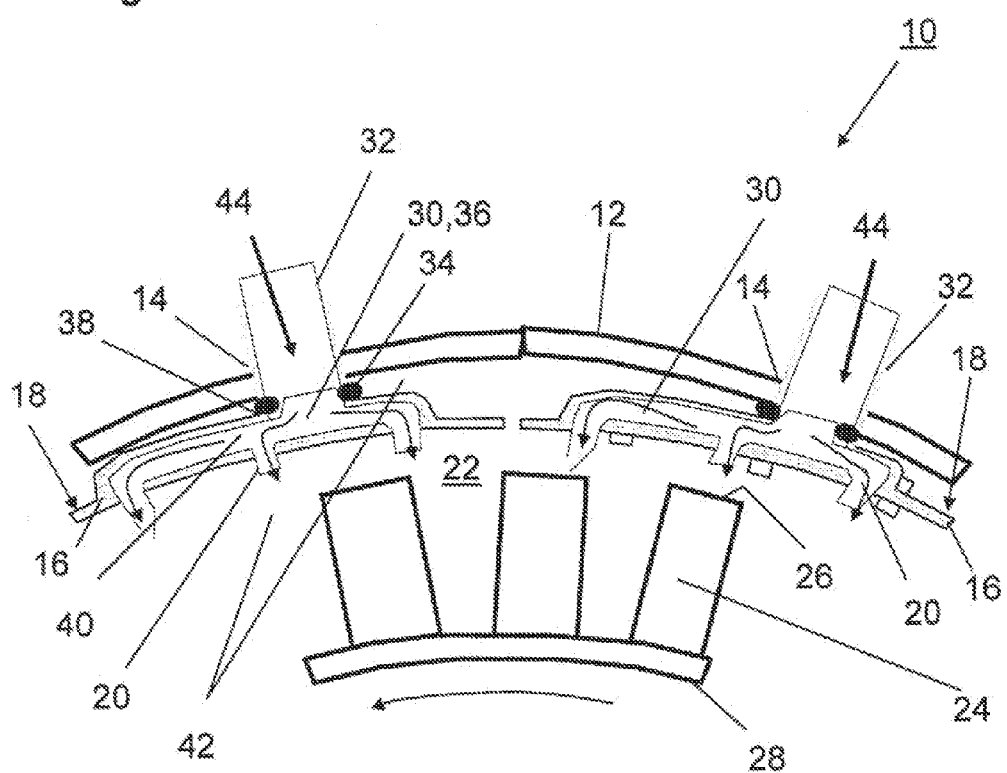

FIG. 1 shows a schematic representation of a cross section through a partial area of a housing 10 of a compressor, in particular of a turbo compressor of an aircraft gas turbine. In this case, the housing 10 is designed in clam-shell fashion and comprises an exterior housing 12 with several air supply openings 14 and an interior housing 18 composed of several individual housing segments 16. One can see that the housing segments 16 have several injection nozzles 20 to inject air supplied via the air supply openings 14 into a flow channel 22 in the area of blade tips 26 of blades 24 of a rotor 28 of the compressor. In addition, the housing segment 16 has an air flow channel 30, with the air flow channel 30 being designed in such a way that a direct air supply occurs to the injection nozzles 20 via an air duct element 32 arranged in the air supply opening 14 of the exterior housing. An area 42 of only low pressure is created between the exterior housing 12 and the interior housing 18 formed by the housing segments 16 so that no extensive sealing measures are required between the individual housing segments 16. Areas 40 of high pressure correspond to the areas surrounded by the air duct channel 30.

In addition, one recognizes that the air supply element 32 is designed in tube-like fashion as a separate element. In this case, a seal 34, in particular a seal designed as an O-ring, is arranged between the air supply element 32 and the air flow channel 30. In this case, the seal 34 rests on a collar 38 formed on the area of the housing segment 16 facing the exterior housing 12 and surrounding an opening 36. The direction of an air stream 44 from an area outside of the exterior housing 12 into the flow channel 22 is shown schematically by means of the arrows.

The housing elements 16 may be made of metal, of a metal alloy, of ceramics, of a fiber-reinforced composite material or of a combination of at least two of these materials.

Figure 2:
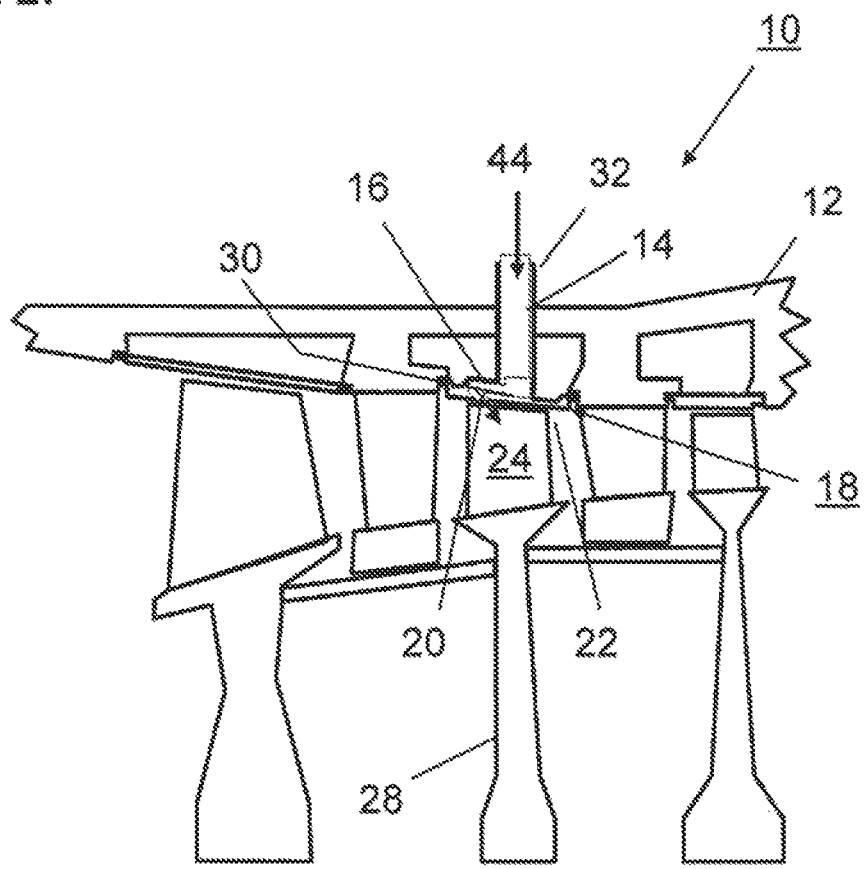
FIG. 2 a schematic representation of a longitudinal cut through a partial area of a housing in accordance with the embodiment.

FIG. 2 shows a schematic representation of a longitudinal cut through a partial area of the housing 10. One recognizes again the two-shell structure of the housing 10 consisting of an exterior housing 12 and an interior housing 18 formed by the housing segments 16. Air moves via the tube-shaped air supply element 32 from outside of the compressor housing 10 into the flow channel 22 in the area of the tips of the blades 24. In the embodiment shown, the blade 24 together with the rotor 28 forms a part of a compressor stage of a turbo compressor. The air led via the air supply element 32 and the air duct channel 30 of the housing segment 16 is fed into the flow channel 22 via the injection nozzle 20 at high pressure.

Figure 3:
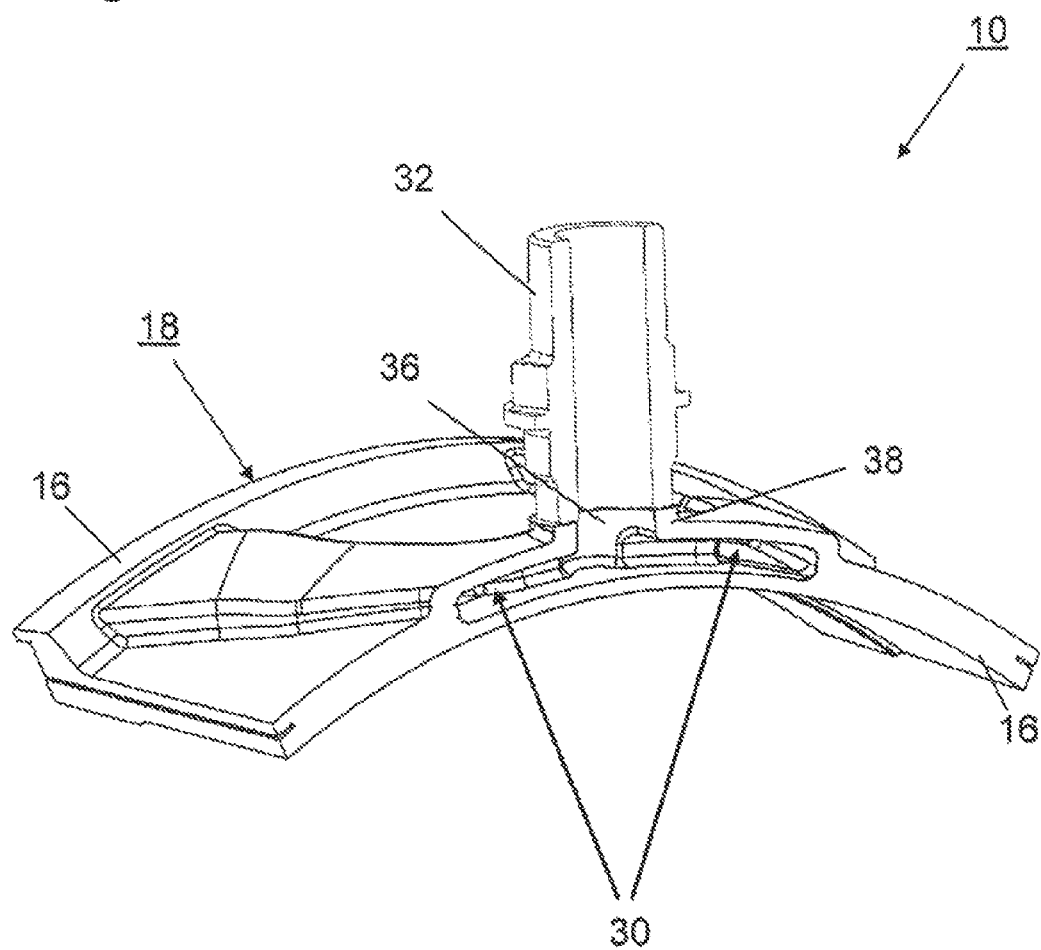
FIG. 3 a schematic, partially cut representation of a housing segment of the housing in accordance with another embodiment of the invention.

FIG. 3 shows a schematic, partially cut representation of a housing segment 16 of the housing 10. In the embodiment shown, the air supply element 32 is designed as a screw-in socket. The seal between the air supply element 32 and the collar 38 of the housing segment 16 is provided by an O-ring (not shown). Moreover, one recognizes the air duct channels 30 formed in the housing segment 16 in integral fashion.

Figure 4:
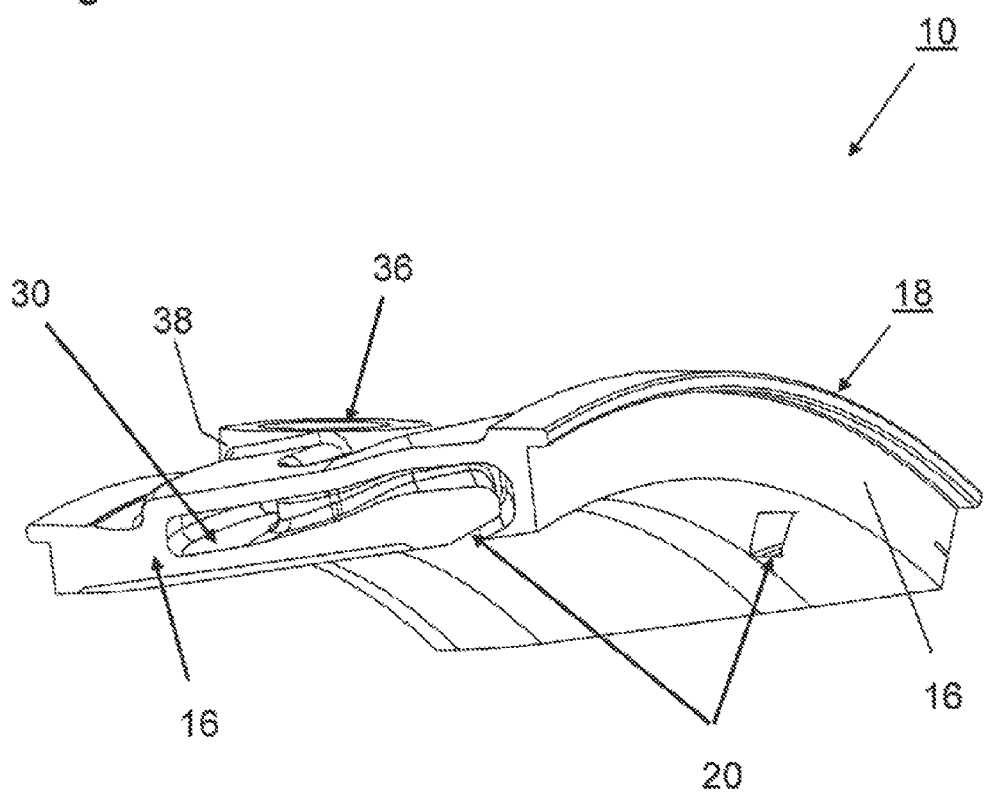
FIG. 4 a schematic, partially cut representation of the housing segment of the housing in accordance with the embodiment.

FIG. 4 shows a schematic, partially cut representation of the housing segment 16 of the housing 10. The arrangement of the air duct channel 30 and of the injection nozzles 20 becomes clear from this representation. The air supply element 32 in turn may be arranged on the collar 38; the air supply occurs via the opening 36.

Moreover, it becomes clear from these figures that the respective housing segment 16 has a bent shape to the effect that a multitude of housing segments 16 form the circular interior housing 18 of the compressor housing 10.

The invention claimed is:

1. A housing for a compressor of a gas turbine, the compressor including a rotor having a plurality of blades and defining a flow channel in the area of the blade tips, the housing for a compressor comprising:
an external housing defining at least one air supply opening formed therethrough and having an air supply element disposed in the air supply opening; and
an interior housing including at least two housing segments, each housing segment defining at least one air flow channel and at least one injection nozzle, the air flow channels adapted to receive air from the air supply element and direct the received air to the injection nozzle for injection through the interior housing into a flow channel on an interior side of the interior housing in the area of the blade tips of blades of a rotor of the compressor.

2. The housing for a compressor in accordance with claim 1, wherein the air supply element is formed as a unitary piece together with the housing segment.

3. The housing for a compressor in accordance with claim 1, wherein the air supply element is configured as one of a socket and a tube.

4. The housing for a compressor in accordance with claim 1, wherein the air supply element is a screw-in socket configured in such a way that a screwed attachment of the air supply element on the exterior housing occurs.

5. The housing for a compressor in accordance with claim 1, further comprising a collar formed on the housing segment of the interior housing surrounding an opening on the housing segment facing the exterior housing, the collar for supporting the air supply element.

6. The housing for a compressor in accordance with claim 1, further comprising at least one seal that is arranged between the air supply element and the housing segment.

7. The housing for a compressor in accordance with claim 6, wherein the seal is an O-ring.

8. The housing for a compressor in accordance with claim 6, wherein the sealing of the air supply element on the housing segment occurs on a circular cross section.

9. The housing for a compressor in accordance with claim 1, wherein the injection nozzle has a slot-like configuration.

10. The housing for a compressor in accordance with claim 1, wherein the housing segment is made of one of a metal, a metal alloy, a ceramic, a fiber-reinforced composite material and a combination of at least two of the aforesaid materials.

11. A compressor of a gas turbine, the compressor comprising:
a rotor having a plurality of blades and defining a flow channel in the area of the blade tips;
a housing including an external housing and an interior housing;
the external housing defining at least one air supply opening formed therethrough and having an air supply element disposed in the air supply opening; and
the interior housing including at least two housing segments, each housing segment defining at least one air flow channel and at least one injection nozzle, the air flow channels adapted to receive air from the air supply element and direct the received air to the injection nozzle for injection through the interior housing into the flow channel on an interior side of the interior housing in the area of the blade tips of blades of the rotor.

12. The compressor in accordance with claim 11, wherein the air supply element is configured as one of a socket and a tube.

13. The compressor in accordance with claim 12, wherein the air supply element is a screw-in socket configured in such a way that a screwed attachment of the air supply element on the exterior housing occurs.

14. The compressor in accordance with claim 12, wherein the housing segment further comprises a collar formed surrounding an opening on the housing segment facing the exterior housing, the collar adapted for supporting the air supply element.

15. The compressor in accordance with claim 12, further comprising at least one seal that is arranged between the air supply element and the housing segment.

16. The compressor in accordance with claim 15, wherein the sealing of the air supply element on the housing segment occurs on a circular cross section.

17. A method for the manufacture of a housing segment of a compressor housing of a gas turbine, the method comprising the following steps:
forming a segment body of an interior housing defining at least one air flow channel and at least one injection nozzle;
wherein the air flow channel may receive air from an air supply element of an exterior housing disposed on the exterior side of the segment body and route the received air to the injection nozzle that inject the air into a flow channel on an interior side of the segmented body; and
wherein the segment body is manufactured by one of a generative manufacturing process, an electrochemical processing method and investment casting.

18. The method in accordance with claim 17, wherein the generative manufacturing process is laser sintering.

* * * * *